United States Patent [19]

Ri et al.

[11] 3,996,902
[45] Dec. 14, 1976

[54] WASTE-GAS SUPPRESSOR FOR INTERNAL-COMBUSTION ENGINES

[76] Inventors: Toyosuke Ri, 1-3, 1-chome, Satonaka-cho,, Nishinomiya, Hyogo; Sachio Yasuda, 25-144, Kitadaimotsu-cho,, Amagasaki, Hyogo; Sadamu Tohdoh, 66-17, 2-chome,, Syohwadohri, Amagasaki, Hyogo, all of Japan

[22] Filed: May 14, 1974

[21] Appl. No.: 469,813

[30] Foreign Application Priority Data

May 15, 1973 Japan .............................. 48-54233

[52] U.S. Cl. ............................. 123/25 B; 123/252
[51] Int. Cl.² ......................................... F02D 19/00
[58] Field of Search ............. 123/25 R, 25 A, 25 B, 123/25 D, 25 L, 25 M, 25 N, 25 P

[56] References Cited
UNITED STATES PATENTS

| | | | |
|---|---|---|---|
| 1,163,402 | 12/1915 | Gillin | 123/25 BP |
| 1,344,793 | 6/1920 | Dasey | 123/25 B |
| 2,073,887 | 3/1937 | Strancke | 123/25 A |
| 2,444,628 | 7/1948 | Briggs et al. | 123/25 B |
| 2,444,670 | 7/1948 | Porter | 123/25 B |
| 2,598,465 | 5/1952 | Thomas | 123/25 A |
| 2,681,048 | 6/1954 | Fox | 123/25 M |
| 2,811,146 | 10/1957 | Spellman | 123/25 A |

Primary Examiner—Charles J. Myhre
Assistant Examiner—Ira S. Lazarus
Attorney, Agent, or Firm—Tab T. Thein

[57] ABSTRACT

Waste-gas suppressor for internal-combustion engines, utilizing negative pressure generated in the carburetor of the engine. A water regulator operated by the negative pressure adjusts water flow in proportion to engine speed, the water being evaporated by the exhaust heat of the engine. The resulting steam is supplied to an air cleaner, and the cleaned air containing the steam is supplied to the combustion chamber of the engine.

14 Claims, 9 Drawing Figures

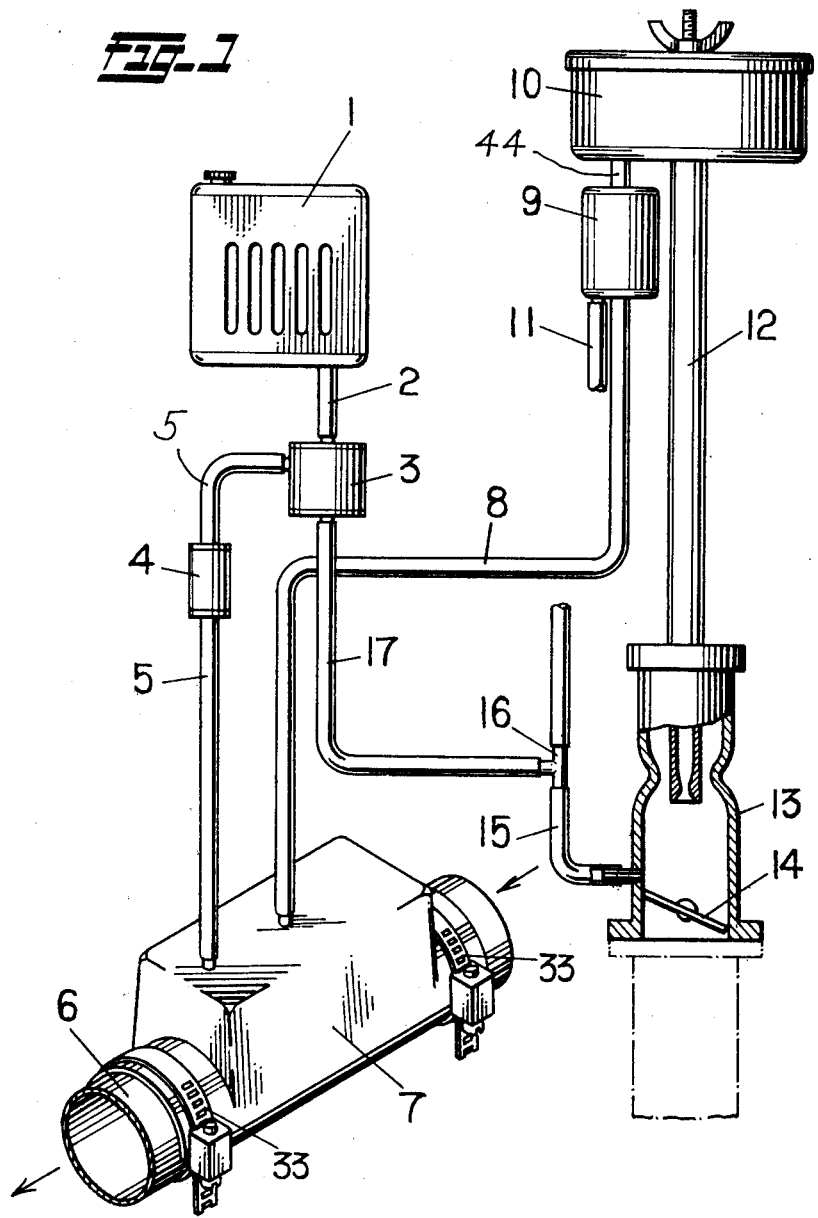

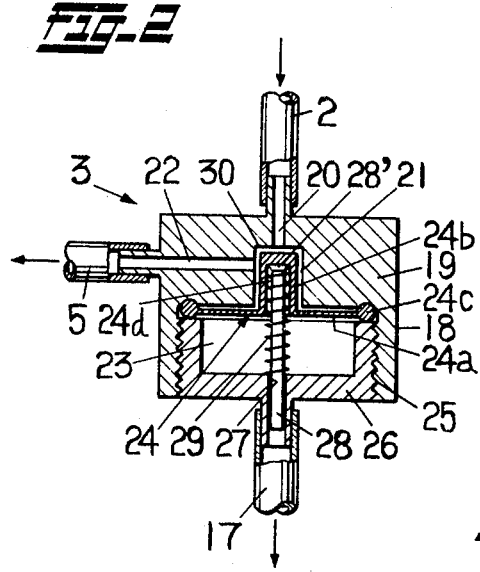
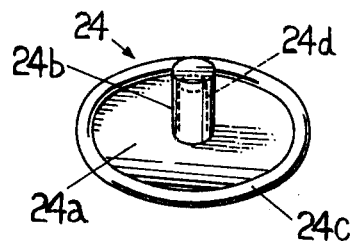
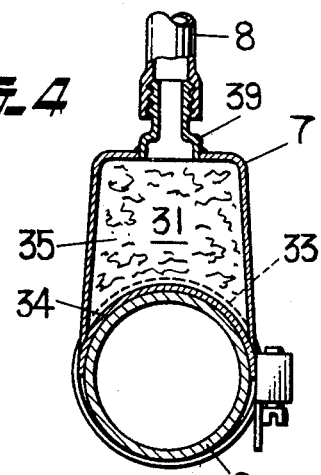
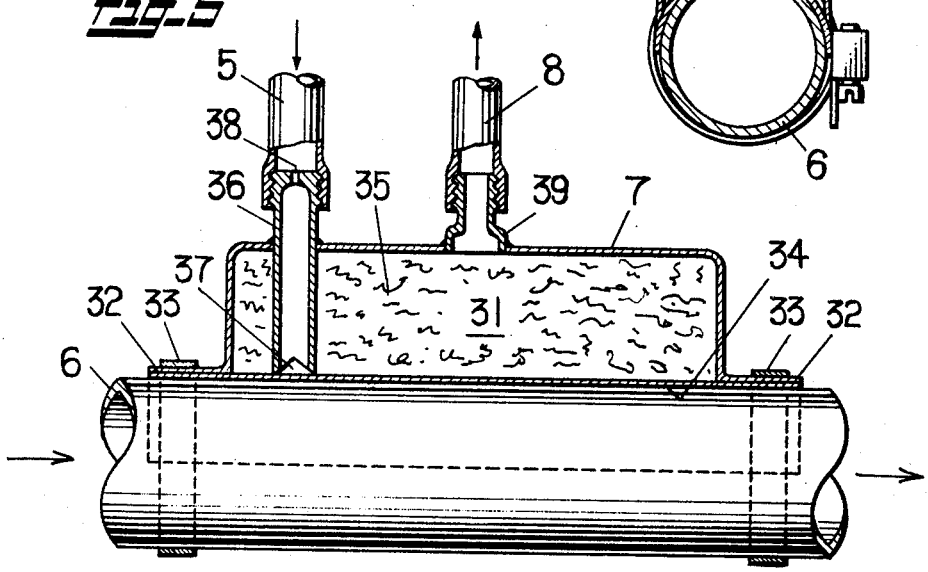

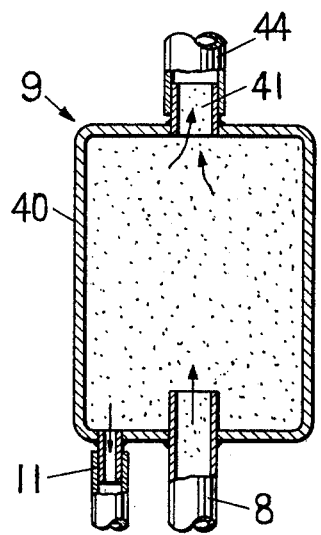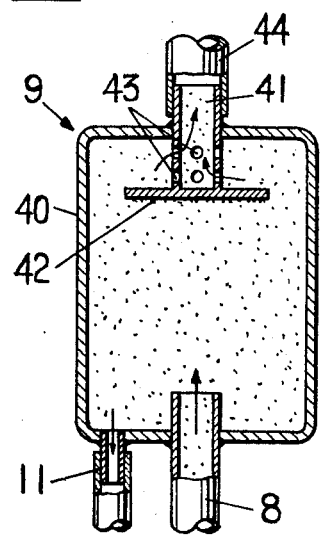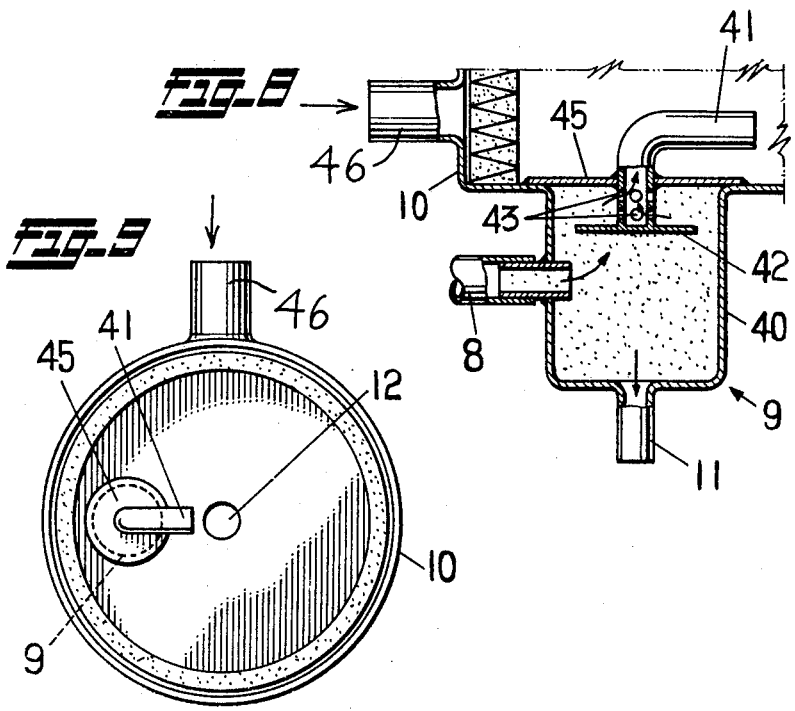

WASTE-GAS SUPPRESSOR FOR INTERNAL-COMBUSTION ENGINES

This invention relates to a device which suppresses the generation of harmful gases contained in waste gas, which is discharged from an internal-combustion engine, e.g. of a car.

The invention relates more particularly to a device which suppresses the generation of waste gas by evaporating water by the exhaust heat of the engine, leading the steam to the combustion chamber of the engine, and distributing uniformly the combustion temperature of the explosive mixture.

Therefore, the principal object of the present invention is to diminish harmful ingredients in waste gases, especially nitrogen oxide.

Nitrogen oxide in waste gas of cars having gasoline engines is generated only at temperatures above approx. 1000° C. Carbon monoxide, on the other hand, is generated largely because the air supply is insufficient (low air - fuel ratio), and partly because the temperature drops near the combustion-chamber wall, which results in incomplete combustion. In addition, hydrocarbons are pyrolyzed and then discharged in the waste gas when combustion is incomplete.

Generally speaking, it is greatly effective, for diminishing nitrogen oxide, to lower the air - fuel ratio to less than the theoretical value. However the lower fuel ratio has a contrary effect, namely in increasing the generation of carbon monoxide.

An experimental report shows that the later ignition takes place, the lower are the densities of nitrogen oxide and hydrocarbons in the waste gas. However, it is difficult to delay ignition time for too long as this also lowers the general efficiency of output, economy, driving stability and other parameters.

We can easily guess that the discharge of nitrogen oxide is influenced by the quantity of water contained in the air from the effect that the water jet in the engine space reduces the generation of nitrogen oxide. This effect reduces the combustion speed of the mixture, reduces the highest combustion temperature, and then diminishes the generative quantity of nitrogen oxide by adding to the mixture inactive materials which do not contribute to the combustion.

Therefore, if a water jet is introduced into the combustion chamber of the engine, in the state of a relatively high-temperature steam, it promotes the thermal reaction of oxygen, the ingredient of steam, and thus promotes complete combustion.

However, such devices have not been produced in a practical form up to the present because devices that produce steam so economically and easily as is necessary for practical purposes could not be provided so far.

Therefore, another object of the invention is to provide a device which generates steam at very low cost, utilizing the high-temperature exhaust heat of the engine itself.

The amount of steam jet used has to be controlled accurately in proportion to the supplied quantity of fuel in order to improve its harmful-gas diminishing effect.

The inventor has noted the phenomenon that negative pressure is generated in the carburetor of the engine, during the intake stroke when the engine is started, and that this negative pressure increases and decreases in proportion to the speed of the working piston. He has then tried to adjust the degree of opening of the flow-adjust valve according to the strength of the negative pressure, and to operate the valve by the negative pressure, by which he has succeeded in controlling the jetted quantity of steam in a proportion correlated to the supplied quantity of fuel.

It is most important not to permit the supplied water to enter the inside of the carburetor through the flow-adjust valve when the same is operated by the suction force generated in the carburetor.

So a further object of the invention is to provide a water regulator which does not permit water to enter into the carburetor while it acts accurately according to the force of the negative pressure.

The invention is characterized in some important aspects in that the highest combustion temperature, around the spark plugs of the engine, at the center of the combustion chamber, decreases at the time of explosion as the steam is distributed uniformly inside the combustion chamber. This suppresses the generation of a large temperature difference between the center and near the walls of the chamber.

The invention is also characterized in that complete combustion of the mixture occurs by a thermal reaction of oxygen, the ingredient of steam, which suppresses the generation of carbon monoxide.

The invention is also characterized by a time lag of the explosion from the ignition occurring by the before-mentioned complete combustion and the mixing of the steam into the mixture, which results in a considerable decrease of the generative quantity of the hydrocarbons.

The invention is further characterized in that the output of the engine increases because of the complete combustion in the explosion of the mixture at small temperature differences inside the combustion chamber, which results in the possibility of cutting the quantity of required fuel, as well as in the reduction of carbon sticking inside the cylinders, which prolongs the span of the engine life.

Other objects and many of the attendant advantages of the invention will be readily appreciated as the same becomes better understood by reference to the following detailed description, when considered with the accompanying drawings, wherein FIG. 1 is a somewhat schematic overall illustration of an exemplary waste-gas suppressor according to the invention;

FIG. 2 is a vertical sectional view of a water regulator constituting an important part of the inventive device;

FIG. 3 is a perspective view of a flow-adjust valve applied in the water regulator of FIG. 2;

FIG. 4 is a vertical sectional view of a steam generator constituting another important part of the invention;

FIG. 5 is a longitudinal elevational view of the steam generator of FIG. 4, partly in section;

FIG. 6 is a vertical sectional view of a steam buffer constituting part of the invention;

FIG. 7 is a vertical sectional view of another embodiment of the steam buffer of FIG. 6;

FIG. 8 is a vertical sectional view of an alternative embodiment of the steam buffer, formed in a single body with an air cleaner; and FIG. 9 is an inside top view of an air cleaner forming part of the inventive device.

In FIG. 1, a tank 1 filled with water is set inside of the right or left fender of the front wheels of a car, or in the space under the windshield wiper, which tank leads to a water regulator 3 through a short tube 2. A steam generator 7 fixed on an exhaust pipe 6 of the engine (not shown in full) is supplied with water, the flow of which is adjustable by the water regulator 3, from a conduit 5 having a filter 4 to remove iron, bleaching powder and other impurities.

A steam tube 8 is connected with the steam generator 7, which tube is connected at the other end with a steam buffer 9 the top of which leads to an air cleaner 10 to supply the steam produced in the steam generator 7 into the cleaner 10, while moisture is discharged to the outside through a drain pipe 11 attached to the buffer 9. The cleaned air containing steam is supplied from the air cleaner 10 to a carburetor 13 of the engine through a tube 12. Furthermore, the cleaned air, of course, is supplied to the combustion chamber of the engine in the fuel mixture.

In a conventional manner, a suction tube 15 connecting with a vacuum device (not shown) is provided at a position above a throttle valve 14 in the carburetor 13. According to this invention, a T-shaped joint 16 is set into the suction tube 15, a negative-pressure tube 17 being set which makes it possible to operate the latter by the nagtive pressure generated in the carburetor 13.

As for the water regulator 3, as shown in detail in FIGS. 2 and 3, an aperture 20 and a valve chest 21, the diameter of which is larger than that of the aperture 20, are set longitudinally in the center of a thick upper plate 19 of a casing 18, while an aperture 22 leading to the conduit 5 is set at the side wall of the valve chest 21. The short tube 2 leading to the tank 1 is connected to the aperture 20, and the conduit 5 leading to the steam generator 7 to the aperture 22, respectively.

In opening 23 in the lower part of the casing 18, a flow-adjust valve 24 is fixed, which is made of an elastic material such as rubber, and which comprises, as is shown in FIG. 3, a circular flat part 24a of a thin film, a conical projecting part 24b of slight thickness, forming a hollow inside part 24b in the center of the flat part 24a, and a ring-shaped peripheral part 24c formed around the periphery of the flat part 24a.

The conical part 24b is inserted into the chest 21, as shown in FIG. 2, the peripheral part 24c being sealed and supported between the casing 18 and a bottom plate 26 which is fixed along a threaded part 25 formed at the inside wall of the casing 18. Between an aperture 27 in the plate 26 and the hollow part 24d, a guide bar 28 stands erect, capable of movement, on which a coil spring 29 is wound, one end of which touches the top 28' of the bar 28 and the other end of which touches the plate 26. This makes the valve 24, and more particularly the projecting part 24b, closely sealed to a valve seat 30 in the chest 21, namely by the pressure of the bar 28.

One end of the tube 17 is connected to the aperture 27 in the plate 26, while the other end is connected with the tube 15 leading to the carburetor 13. Thus at the suction stroke of the engine piston, the negative pressure is applied not only to the carburetor 13 but also to the tube 15, as well as to the tube 17 which leads to the tube 15, by which the valve 24 in the casing 18 is opperated to move downwards, against the pressure of the spring 29. Because this operation separates the projecting part 24b of the valve 24 from the seat 30 and empties the chest 21, water from the tank 1 can be supplied into the steam generator 7 through the water regulator 3 and the conduit 5.

As will be understood from the above description, the flat part 24a performs the function of a water-tight film which shuts off completely the water-supply passage, mainly from the chest 21 to the tube 15 which leads to the carburetor 13. The projecting part 24b performs the role of a piston for the flow-adjust valve 24. The flat peripheral part 24c performs the role of an O-ring put between the casing 18 and the plate 26, which completes the seal and eliminates engine trouble; and the hollow part 24d performs the role of a seat of the bar 28 with the coil spring 29.

As shown in FIGS. 4 and 5, the steam generator 7 has a sealed inner space 31 and flange parts 32 on both sides for fixation. It is connected with the peripheral surface of the exhaust pipe 6 leading from the engine, and is then fixed by clamps 33 for connecting the parts 32 with the exhaust pipe 6. It should however be understood that the sealed space 31 is not exclusively contemplated to be used in the generator 7 since the invention considers its use elsewhere in the system, as will be self-explanatory to those skilled in the art, as covered by the desired scope of the present invention.

It will also be understood that the internal-combustion engine for which the inventive waste-gas suppressor is provided would be intercalated in the schematic set-up of FIG. 1 substantially in the lower right-hand area, with the carburetor 13 leading to the top of the engine, and the inventive steam generator 7 being linked to the engine, interposed between the individual cylinders and the exhaust pipe 6 (with the flange portions 32 and clamps 33 in between, see also FIG. 5). In a conventional manner, the pipe 6 continues as the usual muffler of the engine or car in which it is installed.

It has been confirmed by experiments that metal powder, e.g. copper powder 34 (see again FIG. 5) of high conductivity distributed between the steam generator 7 and the exhaust pipe 6 brings about higher thermal efficiency. Reticulate or porous substances 35 are filled uniformly into the sealed space 31, such as layers of stainless steel, nets, metallic wool, glass wool, rock fiber and non-woven cloth. Evaporation is promoted by the provision of these substances because water supplied from the conduit 5 is distributed uniformly to the substances by their capillarity, and these materials maintain the steam for a limited time after evaporation by the storage action of heat.

This makes it possible to supply the steam to the tube 8 the moment the engine starts, within several minutes after the stopping of the engine. And even if the engine may be stopped for several hours, the moisture maintained uniformly in the substances 35, by their heat-storage capability, is evaporated in a few minutes after the starting of the engine, and then supplied to the tube 8.

In addition, the lower end of a short tube 36, which connects to the conduit 5, touches the bottom near the exhaust pipe 6, and water can flow through a notch 37 of that end. The other end of the tube 36 forms an aperture 38 of a small diameter to prevent the steam from entering backward from the conduit 5 through the tube 36.

The steam generated in the inner space 31 of the generator 7 rises by itself, as will now be described. One end of another short tube 39, the diameter of which is larger than that of the tube 36, is connected with the top of the steam generator 7 in order to lead away the steam therefrom.

The steam in the space 31 is led to the buffer 9 through the tube 8. As is shown in FIG. 6, the buffer 9 comprises a casing 40 through which the upper end of the tube 8 is set, projecting inside the buffer 9, and at the bottom of which the drain pipe 11 is provided.

When cooled in the passage of the steam tube 8, the steam near the dew point becomes moisture, and then it is discharged outwards from the pipe 11 at the bottom of the buffer 9 while only the pure steam is led from the top of the buffer 9 to the air cleaner 10 through a pipe 41. The latter is provided on the buffer 9 and may project into its inside; the opening of the pipe 41 is closed with a buffer plate 42, and plural apertures 43 are provided on the sides of the pipe 41, as is shown in FIGS. 7 and 8.

According to the described structure, when the steam is about to become moisture, it drops by striking against the plate 42, while the pure steam stays above the plate 42 and is then led into the inside of the air cleaner 10 through the apertures 43 and the pipe 41.

Although the steam buffer 9 shown in FIGS. 6 and 7 is connected with the air cleaner 10 through a short tube 44, mass production is possible if the bottom of the air cleaner 10 is formed in a single body with the casing 40 by press work, as illustrated in FIG. 8. In this case the steam tube 8 is connected at the side wall of the casing part 40 and the drain pipe 11 at its bottom, and then a cover plate 45 is fixed on the casing 40 by welding, with which the pipe 41 is provided, as shown in FIG. 8.

As is shown in FIG. 9, the end of the pipe 41 opens toward the center of the air cleaner 10, the cleaned air containing steam being led to the carburetor 13 through the tube 12 connected to the center of the cleaner. In both FIGS. 8 and 9, an air intake is shown at 46.

As is apparent from the above description, the quantity of water which is led to the steam generator 7 from the water regulator 3 through the conduit 5 is controlled by the valve 24 operated by the negative pressure generated in the carburetor 13 at the suction stroke of the engine. The degree of opening of the valve 24 increases and decreases according to the increase and decrease in the number of engine rotations, and therefore the quantity of water supplied into the space 31 of the steam generator is almost precisely in proportion to the number of engine rotations. Consequently the quantity of steam generated in the space 31 is also proportional to the quantity of water.

As the number of the engine revolutions is proportional to the supplied quantity of fuel, such as gasoline or light oil, the steam corresponding to the supplied quantity of fuel is fed to the combustion chamber of the engine, and the steam is supplied to the chamber regardless of the speed of the car. It will be understood that the density of the steam is always proportional to the speed of the car.

It should be understood of course that the foregoing disclosure relates only to preferred embodiments of the invention, and that it is intended to cover all changes and modifications of the examples described which do not constitute departures from the spirit and scope of the invention.

What I claim is:

1. A water-gas suppressor for internal-combustion engines, the latter including a carburetor (13), a combustion chamber and an exhaust pipe (6); the suppressor comprising, in combination, a water tank (1); a regulator (3) for adjusting the flow of the water supplied from said tank by an adjusting valve (24) operated by negative pressure generated by said carburetor; a steam generator (7) for evaporating the water, that is supplied from said regulator, by the heat of said exhaust pipe in a sealed space (31); and a steam buffer (9) provided between said generator and an air cleaner (10), for leading only the pure steam generated in said generator into said air cleaner; wherein said generator has attached thereto a conduit (5) and a steam tube (8) which both lead to said sealed space, respectively from said water tank by way of said regulator, and from said air cleaner by way of said steam buffer; said conduit leads to a short tube (36), one end of which forms an aperture (38) of a small diameter while its other end leads to the bottom of said sealed space; and said steam tube leads to another short tube (39), one end of which, of a larger diameter than that of the first-named short tube, leads to the top of said sealed space.

2. The waste-gas suppressor as defined in claim 1, wherein said valve (24) is made of elastic materials, and includes a circular flat part (24a) of a thin film, a conical projecting part (24b) of slight thickness, forming a hollow part (24d) substantially in the center of said flat part, and a ring-shaped peripheral part (24c) formed around said flat part.

3. The waste-gas suppressor as defined in claim 1, wherein said regulator (3) includes a casing (18, 19) having an opening therein, a plate (26) fixed in said opening, said valve (24) being sealed tightly between said casing and said plate.

4. The waste-gas suppressor as defined in claim 3, wherein said regulator (3) further includes a chest (21, 30) formed between said casing (18, 19) and said valve (24), and a space formed between said valve and said plate (26) for receiving the negative pressure, said chest being opened and closed by the operation of said valve.

5. The waste-gas suppressor as defined in claim 1, wherein said sealed space (31) is provided in said generator (7), and has therein an evaporation-promoting substance (35).

6. The waste-gas suppressor as defined in claim 5, wherein said evaporation-promoting substance (35) is reticulate, e.g. layers of stainless steel, nets and nonwoven cloth.

7. The waste-gas suppressor as defined in claim 5, wherein said evaporation-promoting substance (35) is porous, e.g. metallic wool, glass wool and rock fiber.

8. The waste-gas suppressor as defined in claim 1, wherein said steam buffer (9) includes a casing (40).

9. The waste-gas suppressor as defined in claim 8, wherein said casing (40) includes said steam tube (8), the top end of which projects slightly inside said casing (40), a drain tube (11) from which moisture is discharged, and a pipe (41) which supplies the pure steam into said air cleaner (10).

10. The waste-gas suppressor as defined in claim 9, wherein said casing (40) of the buffer (9) leads to said air cleaner (10) through a short tube (44).

11. The waste-gas suppressor as defined in claim 9, wherein said casing (40) is integrally formed with said air cleaner (10).

12. The waste-gas suppressor as defined in claim 9, wherein one end of said pipe (41) opens inside said casing (40).

13. The waste-gas suppressor as defined in claim 9, wherein one end of said pipe (41) is closed by a buffer plate (42) and has plural apertures (43) in its side.

14. The waste-gas suppressor as defined in claim 9, wherein the other end of said pipe (41) opens toward the center of said air cleaner (10).

* * * * *